(12) United States Patent
Tsai

(10) Patent No.: US 7,002,715 B2
(45) Date of Patent: Feb. 21, 2006

(54) PAPER PRESSING DEVICE FOR A SCANNER

(75) Inventor: Chung-Hua Tsai, Hsinchu (TW)

(73) Assignee: Portable Peripheral Co., Ltd., Hsinchu (TW)

( * ) Notice: Subject to any disclaimer, the term of this patent is extended or adjusted under 35 U.S.C. 154(b) by 918 days.

(21) Appl. No.: 10/071,122

(22) Filed: Feb. 8, 2002

(65) Prior Publication Data

US 2003/0151779 A1     Aug. 14, 2003

(51) Int. Cl.
*H04N 1/04* (2006.01)
(52) U.S. Cl. .................. 358/498; 358/496; 358/474
(58) Field of Classification Search ................ 358/496, 358/498, 474, 471; 399/367; 271/117, 124, 271/223, 142
See application file for complete search history.

(56) References Cited

U.S. PATENT DOCUMENTS

| | | | | |
|---|---|---|---|---|
| 4,970,606 A | * | 11/1990 | Shima | 358/474 |
| 5,101,284 A | * | 3/1992 | Tanabe | 358/461 |
| 5,130,807 A | * | 7/1992 | Tanabe et al. | 358/296 |
| 5,468,943 A | * | 11/1995 | Gatto et al. | 235/454 |
| 5,768,448 A | * | 6/1998 | Ichinose | 382/312 |
| 5,805,307 A | * | 9/1998 | Park | 358/471 |
| 5,969,831 A | * | 10/1999 | Ichinose | 358/498 |
| 5,973,799 A | * | 10/1999 | Gatto et al. | 358/498 |
| 5,986,775 A | * | 11/1999 | Yoshimizu | 358/496 |

* cited by examiner

*Primary Examiner*—Cheukfan Lee

(57) ABSTRACT

A scanner has a hollow base, a bracket securely received in the hollow base and having a paper-pressing bar mounted onto the bracket, a top seat securely provided to one side of the hollow base and a top cover mounted on top of the top seat. The top cover has a pressing plate extending into an interior of the top seat and a pair of pressers each extending to engage with and abut the paper-pressing bar. The paper-pressing bar has a driven gear mounted on one distal end thereof so as to correspond to a driving gear of the bracket and a rubber sleeve mounted on the paper-pressing bar to increase a friction. The paper-pressing bar is releasably mounted on a pair of cutouts in the bracket so that the paper-pressing bar is able to move vertically relative to the bracket.

4 Claims, 5 Drawing Sheets

PAPER PRESSING DEVICE FOR A SCANNER

FIELD OF THE INVENTION

The present invention relates to a method of applying a paper pressing device for a scanner, and more particularly to a paper pressing device which is able to maintain the paper flat while being scanned and is able to adapt to various thickness changes of the paper scanned.

BACKGROUND OF THE INVENTION

There are three different scanners on the market, one is the paper-feed type, one is the platform type and the third one is the hand-held type. The paper-feed type scanner uses a paper-feed mechanism to suck in the paper placed inside the scanner, which has better performance and resolution when compared with the platform and the hand-held types. However, the paper-feed type scanner still suffers from shortcomings.

When the paper is being sucked in the scanner by the paper-feed mechanism and guided by the paper-guiding bar, the thickness and the flatness of the paper being scanned affect the overall performance of the scanned result. Sometimes, the scanned result is not as good as expected when the paper is wrinkled and is not able to completely engage with the paper-guiding bar. Therefore, blur and stain may appear on the scanned paper. Furthermore, due to the flatness of the paper, the paper scanned may be shifted during engagement with the paper-guiding bar. In order to overcome the shortcoming, a scanner with a spring to straighten the paper is introduced to the market. This kind of scanner though solves the paper flatness problem, the paper-guiding bar movement is still limited. That is, I the thickness of the paper scanned is too thick, the paper-guiding bar is not able to adjust its movement to cope with the thickness change of the paper.

To overcome the shortcomings, the present invention intends to provide an improved paper pressing device for a scanner to mitigate or obviate the aforementioned problems.

SUMMARY OF THE INVENTION

The primary objective of the invention is to provide a paper pressing device for a scanner. The paper pressing device is able to move according to the paper thickness and is able to maintain full engagement with the paper.

Other objects, advantages and novel features of the invention will become more apparent from the following detailed description when taken in conjunction with the accompanying drawings.

DETAILED DESCRIPTION OF THE INVENTION

Figure 1:
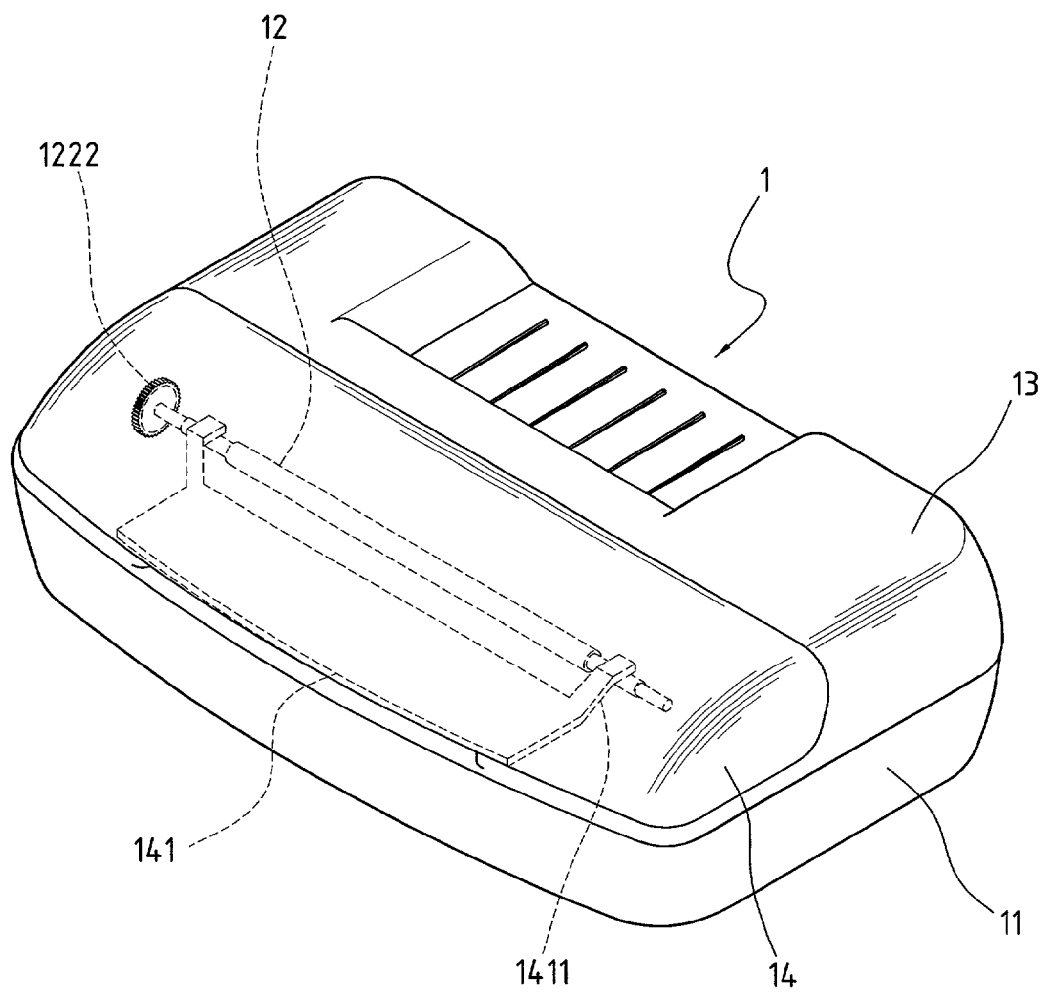
FIG. 1 is a perspective view of a scanner with the paper pressing device of the present invention.
Figure 2:
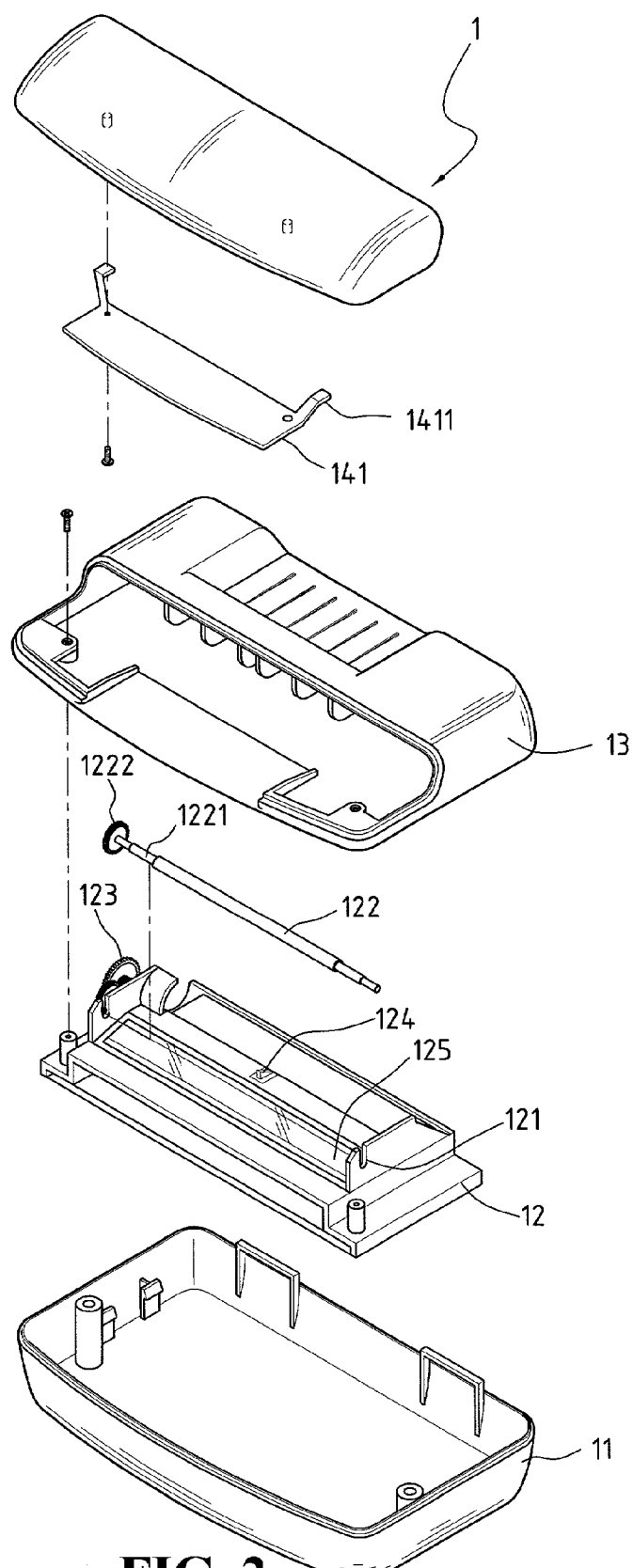
FIG. 2 is an exploded perspective view of the scanner shown in FIG. 1.

With reference to FIGS. 1 and 2, a scanner constructed in accordance with the present invention is shown and composed of a hollow base 11, a bracket 12, a top seat 13 and a top cover 14.

The bracket 12 is securely received in the hollow base 11 and has a pair of cutouts 121 each defined on opposite sides of the bracket 12 to releasably support thereon a paper-pressing bar 122 which has a rubber sleeve 1221 securely mounted onto the paper-pressing bar 122 and a driven gear 1222 securely provided to a distal end of the paper-pressing bar 122 to correspond to a driving gear 123 rotatably mounted on one side of the bracket 12. The bracket 12 further has a sensor 124 mounted thereon to sense the feed of paper, so that when the sensor 123 senses the feed of a paper, the signal from the sensor 123 initiates the rotation of the driving gear 123, which in turn rotates the driven gear 1222.

The top seat 13 is secured to one side of the hollow base 11 and the top cover 14 is mounted on top of the top seat 13. The top cover 14 has a pressing plate 141 extending into an interior of the top seat 13 and having two resilient material made pressers 1411. The presser 1411 extends to engage with and to abut one end face of the paper-pressing bar 12 to maintain the paper-pressing bar 12 to engage with an optical sensing screen 125. Due to the resilience of the presser 1411, the paper-pressing bar 122, though pressed by the presser 1411, is still move vertically with respect to the bracket 12.

Figure 3:
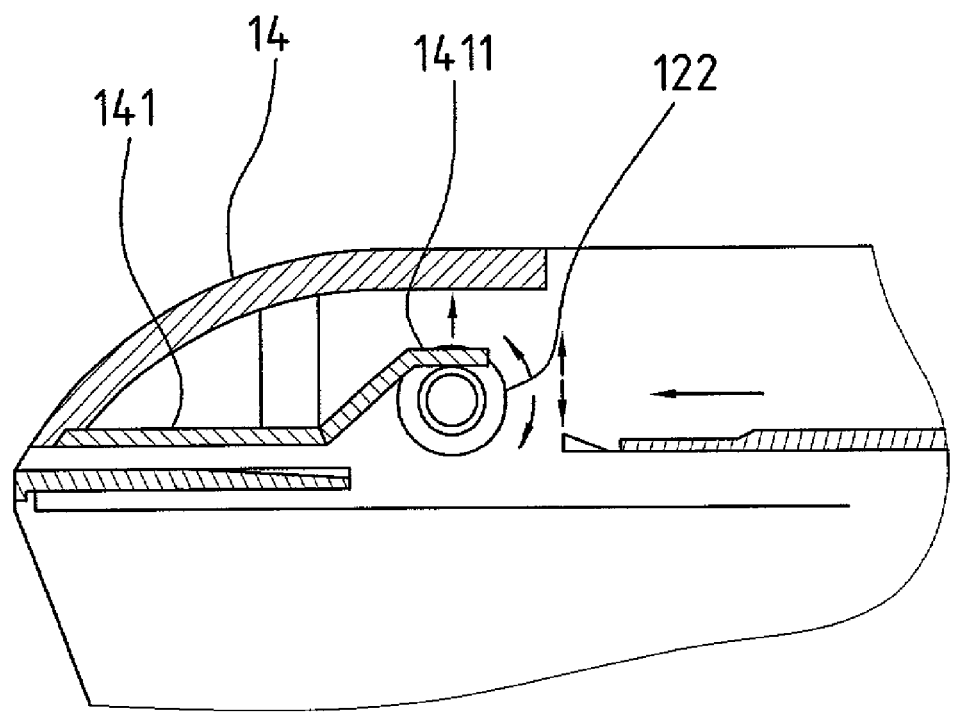
FIG. 3 is a schematic view showing the first operational movement of the invention.
Figure 4:
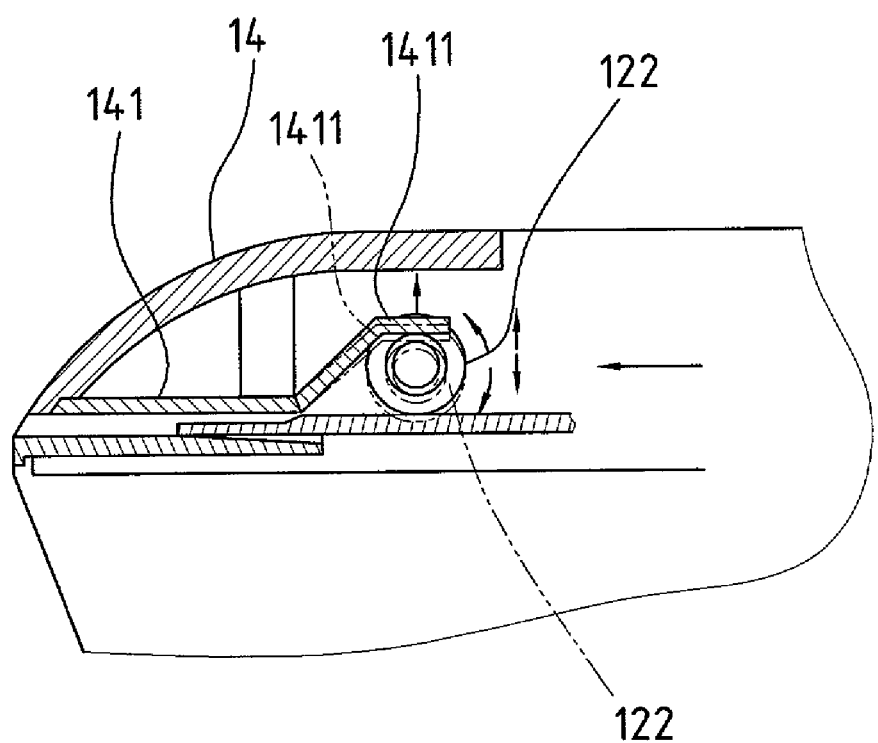
FIG. 4 is a schematic view showing the second operational movement of the invention.
Figure 5:
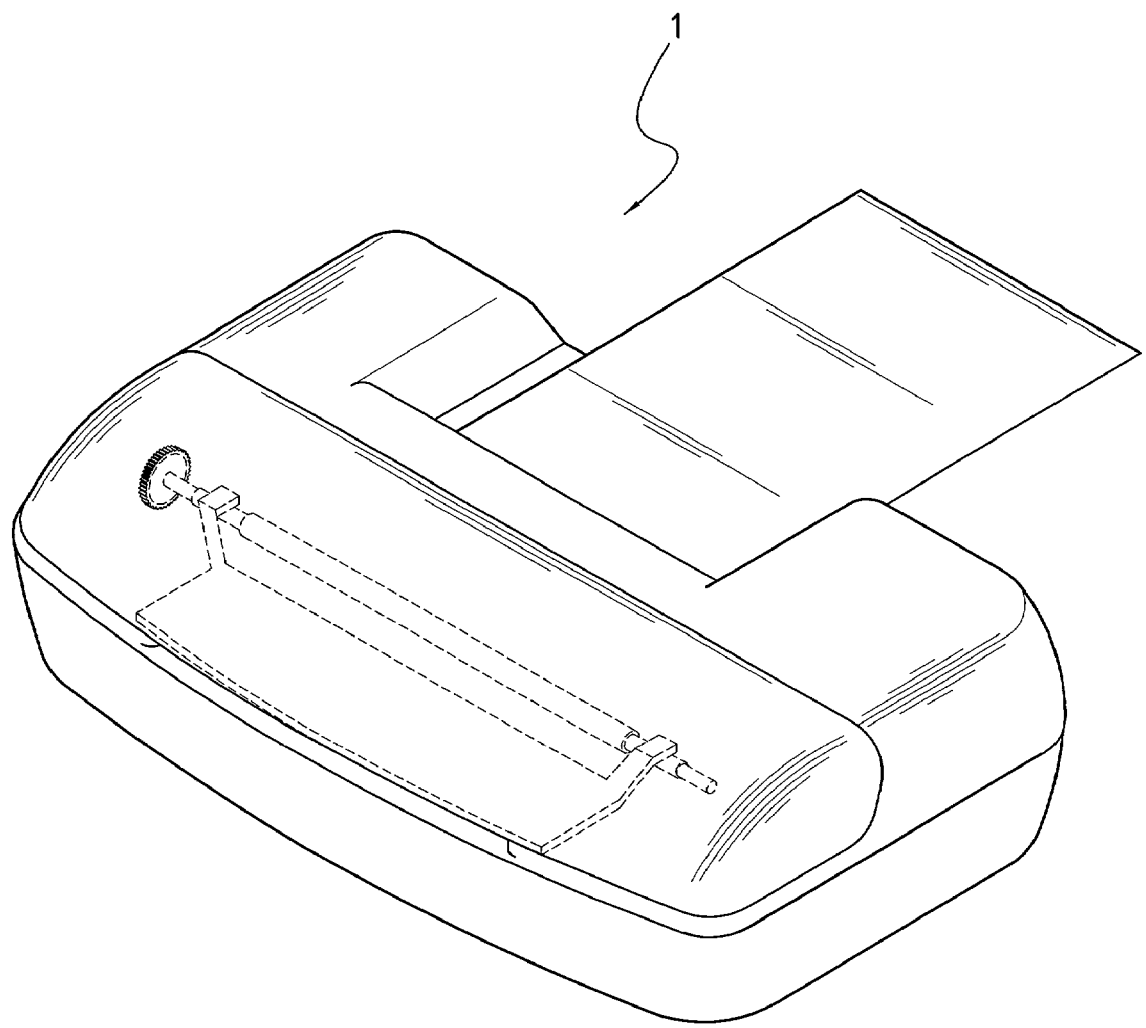
FIG. 5 is a schematic view showing the preferred embodiment of the present invention.

With reference to FIGS. 3, 4 and 5, after the scanner is assembled and is in operation, a paper fed into the scanner will be detected by the sensor 124, which initiates the rotation of the driving gear 123 and then the driven gear 1222. After the paper-pressing bar 122 is rotated by the feed of a paper, the friction between the rubber sleeve 1221 and the paper to be scanned is able to convey the paper into the scanner. Furthermore, because the paper-pressing bar 122 is releasably mounted in the cutouts 121 and onto the bracket 12 and the presser 1411 abutting one end face of the paper-pressing bar 122 is made of a resilient material, the paper-pressing bar 122 is able to move vertically relative to the bracket 12, which means that when the paper thickness changes, the scanner is still able to cope with the thickness change and to generate good scanned result.

That is to say, when the thickness of the paper is thick, the paper-pressing bar 122 is forced to move upward to the bracket 12 and when the paper thickness of the paper is thin, the originally deformed pressers 1411 return to their original shape, which maintains the paper-pressing bar 122 to engage with the optical sensing screen 125 at all times.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A scanner having a hollow base, a bracket securely received in the hollow base and having a paper-pressing bar mounted onto the bracket, a top seat securely provided to one side of the hollow base and a top cover mounted on top of the top seat, wherein the improvements comprise:

the top cover having a pressing plate extending into an interior of the top seat and a pair of pressers each extending to engage with and abut the paper-pressing bar.

2. The scanner as claimed in claim 1, wherein the paper-pressing bar has a driven gear mounted on one distal end thereof so as to correspond to a driving gear of the bracket and a rubber sleeve mounted on the paper-pressing bar to increase a friction.

3. The scanner as claimed in claim 2, wherein the presser and the pressing plate are made of a resilient material.

4. The scanner as claimed in claim 1, wherein the paper-pressing bar is releasably mounted on a pair of cutouts in the bracket so that the paper-pressing bar is able to move vertically relative to the bracket.

* * * * *